United States Patent [19]

Kauppi et al.

[11] 4,319,116
[45] Mar. 9, 1982

[54] WELDING USING SOAP SHIELDING

[76] Inventors: Markku Kauppi, 54750 Välijoki; Juhani Niinivaara, 54710 Lemi, both of Finland; Markku Nurminen, deceased, late of Husupyöli, Finland; by Marjatta Nurminen, administrator, Pyölinrinne 17 C 4, 49510 Husupyöli, Finland

[21] Appl. No.: 52,150

[22] Filed: Jun. 26, 1979

[30] Foreign Application Priority Data

Jun. 28, 1978 [FI] Finland .................................. 780282
Jun. 30, 1978 [FI] Finland .................................. 780283

[51] Int. Cl.³ .................. B23K 9/16; B23K 35/38; B23K 35/02; B23K 35/34
[52] U.S. Cl. ................................ 219/72; 219/145.41; 219/146.52
[58] Field of Search ................. 219/72, 145.41, 146.52

[56] References Cited

U.S. PATENT DOCUMENTS

| 2,446,922 | 8/1948 | Grundner | 219/137 R X |
| 2,497,629 | 2/1950 | Rieppel | 219/146.52 X |
| 3,835,288 | 9/1974 | Henderson | 219/145.41 |

FOREIGN PATENT DOCUMENTS

| 2231975 | 3/1973 | Fed. Rep. of Germany . | |
| 26707 | 1/1955 | Finland . | |
| 7238907 | 6/1973 | France | 219/145.41 |
| 131148 | 6/1978 | German Democratic Rep. | 219/72 |
| 78030 | 2/1951 | Norway . | |
| 80834 | 8/1952 | Norway . | |
| 126245 | 5/1919 | United Kingdom | 219/145.41 |
| 591640 | 8/1947 | United Kingdom | 219/145.41 |

OTHER PUBLICATIONS

*The Condensed Chemical Dictionary*, Ninth Edition 1977 pp. 514, 636, 781–782, 836; Litton Educational Publishing Inc.; Published by Van Nostrand Reinhold Co., N.Y.

Noller, Carl R.; *Chemistry of Organic Compounds;* 3rd Edition, W. B. Saunders Co., 1966; p. 968.

*The Condensed Chemical Dictionary*, 4th Edition, 1950; Reinhold Publishing Corp., N.Y.; p. 586.

*Primary Examiner*—Gene Z. Rubinson
*Assistant Examiner*—Keith E. George
*Attorney, Agent, or Firm*—McAulay, Fields, Fisher, Goldstein & Nissen

[57] ABSTRACT

A procedure is disclosed in the application, for carrying out arc welding under water or in otherwise difficult external conditions. In the procedure, there is introduced in the arc area or in its immediate vicinity, an auxiliary substance having the purpose to boost the ignition of the arc and its burning and to retard the cooling of the weld bead produced, so that the emergence of gases from the welded seam is promoted and the quality of the weld seam improves. The auxiliary substance used consists mainly of soap which is a salt formed by anions of a fatty acid, a fatty acid mixture or a mixture of fatty and resin acids and by metal cations or a mixture of such salts and which may in addition contain water and inorganic salts. Best results have been obtained by using for auxiliary substance soft soaps made of tall oil and which contain salts of both fatty acids, such as oleic and linoleic acid and of resin acids, such as abietic acid. Good results have further been obtained with soft soaps based exclusively on salts of saturated or unsaturated fatty acids.

10 Claims, 4 Drawing Figures

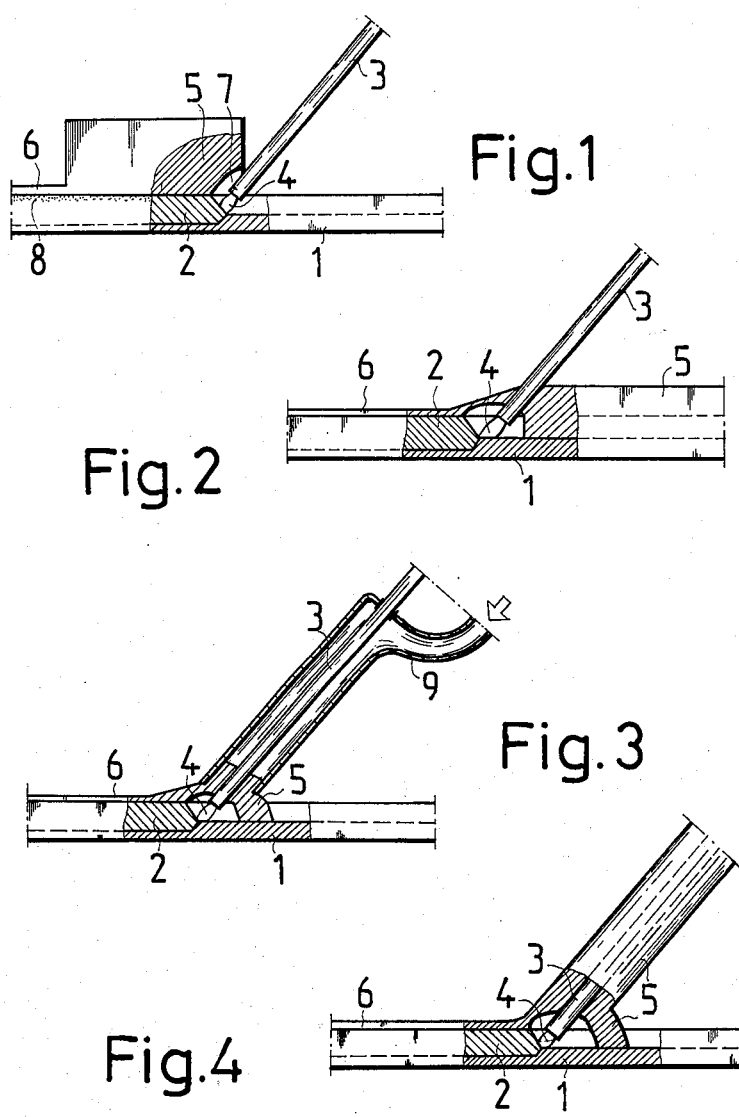

WELDING USING SOAP SHIELDING

The present invention concerns a procedure to be applied in arc welding, wherein an auxiliary substance is introduced in the arc area or immediately adjacent thereto.

It is commonly known that the performing of arc welding, which is easy to apply under favourable external conditions, meets with difficulties in windy, draughty, rainy or otherwise wet conditions. This is particularly true for underwater welding, which has been a subject of increasing interest and development work in recent years. Underwater welding has been used, above all, in repair work on drilling rigs, underwater gas and oil pipelines, ships and harbour installations, which are either impossible or unreasonably expensive to lift out of the water.

The methods known in prior art for the performing of underwater welding work may be divided, according to the welding environment, into wet methods and dry methods. By the dry methods, in which the access of water to the arc area is prevented with the aid of a welding guard, welds of nearly the same quality are achieved as in normal welding taking place in air. It is however a drawback that the mounting and shifting of the welding guard is cumbersome and time-consuming; there are furthermore numerous points where no welding guard may be used. The wet methods, in which the water has free access to the arc area, are free of the difficulties mentioned. This is because underwater welding according to the wet method may be carried out using (if the diving gear is not counted) the same equipment as in normal welding taking place in air. It is true that when welding electrodes are used these have to be coated with a water-tight vinyl paint or with paraffin preventing their wetting, and in gas arc welding one has used in addition to the conventional means, a welding tool producing a conical water jet to protect the arc area. But it is a fact that the quality of welds obtained by the wet methods does not come close to that quality which has been achieved by dry methods.

In connection with wet methods there occur three factors of detrimental effect on the quality of the weld, all being due to the surrounding water. These factors are: high cooling rate, high hydrogen content, and the surrounding pressure, which affects the reactions taking place in the arc and the transfer of matter, as well as the reactions between melt and slag (at greater depths in particular). The worst problem is the occurrence of hydrogen cracks owing to the higher oxygen content which the welded joint takes up. The high cooling rate has a further retarding effect on the diffusion of hydrogen out of the welded joint, and pre- and after-heating for hydrogen elimination, stress deducing or avoidance of a brittle microstructure can hardly be contemplated. As a result of the high cooling rate, structural steels most often develop a microstructure with high internal stresses and tending to embrittlement. The pressure from the water, again, changes the slag conditions, in particular those at great depth, resulting in a poor impact strength of the welded joint. It is particularly on electrode welding work done by the wet method that the avoiding of welding defects such as pores, slag inclusions, slag line, joint and root defects requires a particularly high skill under difficult conditions.

The object of the present invention is to eliminate the drawbacks associated with welding performed under difficult conditions, by providing an arc welding procedure by which the welding can be successfully performed independent of external conditions. The invention is quite particularly appropriate for use in wet welding under water, or in otherwise wet conditions, and it is characterized in that into the arc area or its vicinity there is introduced an auxiliary substance containing soap, which is a salt constituted by fatty acids, a mixture of fatty acids or fatty acid and resin acid anions and metal cations or such a salt mixture.

In welding tests good and even excellent results have been obtained using auxiliary substances as taught by the invention, these results being more closely presented in the embodiment examples stated farther below. The action mechanism of the substances is not fully understood, but the results may be due to the synergy of several factors. For instance, the auxiliary substance facilitates the control ignition of the arc and its burning in water, and as it burns it produces a protective gas zone which prevents the direct presence of water in the arc area and its contact with the weld melt. The auxiliary substance further contributes to formation of a slag layer to protect the weld melt and which delays the cooling of the weld and thereby promotes the separation of gases from the weld. The auxiliary substance, when burning, also releases a remarkable amount of thermal energy, which additionally promotes the burning of the arc and retards the cooling of the weld. It is moreover possible that the electrolyte properties of the auxiliary substance have an influence on the results of welding which it is possible to obtain. To wit, it is conceivable that the auxiliary substance produces electric currents between the object that is being welded and the slag layer upon it. This would improve the chances of the joint-embrittling hydrogen to escape, and the seam will have even greater strength.

The procedure of the invention is applicable in all and any arc and gas arc welding modes, such as electrode welding, MIG, MAG, TIG. Arcaton or plasma welding. The equipment and apparatus used for the work vary in accordance with the welding modes. Although the present invention may be applied both in underwater welding and also in welding taking place under other difficult external conditions, the following description concentrates on the first instance, because at present the very greatest problems associated with welding are encountered in the field of underwater arc welding.

The invention further relates to a welding rod coated with an auxiliary substance, said rod being characterized in that the auxiliary substance contains soap, which is a salt formed by the anions of a fatty acid, a fatty acid mixture or a mixture of fatty and resin acids and by metal cations or such a salt mixture.

Various embodiments of the invention shall be described in detail in the following, with reference being made to the attached drawing, wherein:

FIG. 1 presents an embodiment wherein the auxiliary substance is moved along with the welding electrode.

FIG. 2 presents an embodiment wherein the welding is carried out through a layer of the auxiliary substance.

FIG. 3 presents an embodiment wherein the auxiliary substance is conducted to the point of welding through a tubular guiding means, and FIG. 4 presents an embodiment wherein the welding electrode has been coated with the auxiliary substance.

FIG. 1 illustrates how a welded joint 2 is formed on a plate-like base 1 under water with the aid of a welding electrode 3 so that the arc 4 produced between the base and the tip of the electrode is partly protected by the piece of auxiliary substance 5, which may consist e.g. of soft tall oil soap. In the flank of the piece of auxiliary substance 5 a hollow 7 is produced in the course of welding, and the auxiliary substance is moved after the welding electrode 3 so that the arc 4 is continuously largely enclosed in the hollow. As the welding proceeds, there remains behind the piece of auxiliary substance 5, a protective layer formed by the slag 8 produced in connection with welding and by matter 6 detached from the piece. This layer prevents the cooling of the weld joint 2 and it inhibits the contact between water and the weld joint. Furthermore, the high temperature of the joint 2 may have the result that the auxiliary substance in the protective layer continues to burn, and this is conducive to efficient prevention of an excessive cooling rate.

The embodiment of FIG. 2 differs from the preceding mainly in that the gap to be bridged by welding has been coated, already before the welding process, with a course 5 of paste-like auxiliary substance, and through which the welding is carried out. Thereby the auxiliary substance serves, throughout the welding operation, as an efficient protection for the weld bead 2 that is being formed. Upon the bead a protective layer 6 is produced similarly as in the preceding example.

In the embodiment of FIG. 3, the paste-like auxiliary substance 5 is conducted to the point where the welding is in progress, by means of a tubular guiding means 9, which at the same time surrounds the welding electrode 9. Thus, the guiding means 9 serves as an annular nozzle encircling the welding electrode 3. In other respects this embodiment is equivalent to the preceding.

In the embodiment illustrated by FIG. 4, the welding electrode 3 has been coated with a paste-like auxiliary substance 5, which in the course of welding spreads out over the arc 4 and the weld bead 2 that is being formed. The burning of the arc and formation of the protective layer 6 upon the bead 2 are similar to what takes place in the preceding examples.

The following examples are meant to illustrate the auxiliary substances used in the procedure of the invention.

EXAMPLE 1

A welding test was carried out under water, at a depth of 3 m, by a method as shown in FIG. 1 and using soft tall oil soap as auxiliary substance. The soft tall oil soap was solid and it contained about 20% water and about 80% dry matter, whereof about 75% were sodium salts of fatty acids, mainly of oleic and linoleic acid, about 25% were sodium salts of resin acids such as abietic, dehydroabietic- pimaric and isopimaric acid, and about 5% soda. The steel that was being welded was a special high strength fine grain steel as specified in SFS 250, and acid coated unalloyed electrodes ISO E 43 4AR24 (OK50.10) were used in the test. The welded bars were subjected to tensile tests according to SFS 3173 and to impact tests according to SFS 2853, and the results from these tests are shown in Tables 1-2.

TABLE 1

| Bar No. | tensile tests | |
| --- | --- | --- |
| | 1 | 2 |
| Width, mm | 20.0 | 20.0 |
| Thickness, mm | 16.1 | 16.1 |
| Cross section area, mm$^2$ | 322 | 322 |

TABLE 1-continued

| Bar No. | tensile tests | |
| --- | --- | --- |
| | 1 | 2 |
| Ultimate strength, N/mm$^2$ | 550 | 545 |
| Fractura: base material B, weld W | B | B |
| Distance from melt boundary, mm | 10 | 10 |

TABLE 2

| Bar Code | impact tests | Bar Code | |
| --- | --- | --- | --- |
| S 1 | 27 KV/0° C. | H 7 | 40 KV/0° C. |
| S 2 | 31 KV/0° C. | H 8 | 39 KV/0° C. |
| S 3 | 36 KV/0° C. | H 9 | 40 KV/0° C. |
| S 4 | 36 KV/−20° C. | H 10 | 32 KV/−20° C. |
| S 5 | 26 KV/−20° C. | H 11 | 27 KV/−20° C. |
| S 6 | 17 KV/−20° C. | H 12 | 26 KV/−20° C. |

In the tensile tests, fracture of the bars occurred clearly in the base material, in spite of the added material being softer than the base material (the pure weld material had ultimate strength 440-490 N/mm$^2$). The impact strength noted in the impact tests is also adequate at those temperature which are encountered under water.

The welded joints were furthermore subjected to x-ray examination, which gave for the joints the x-ray class 3 (with assessment scale from 1 to 5-1 poorest and 5 best). The welded joints merely presented porosity and in the microstructure assay a few small slag inclusions were observed, and in the top bead close under the surface, pores not discernible in the x-ray.

In addition to the welding according to the invention, a parallel reference test was carried out in which a similar welding job was carried out without auxiliary substance. The weld joints then obtained were not acceptable of their configuration: they presented shape defects, hydrogen cracks and checking due to internal stresses. The tests revealed that to achieve a weld seam with acceptable configuration and to avoid planar welding defects is clearly easier in the procedure of the invention than in conventional wet welding methods without auxiliary substance. The absence of so-called planar welding defects implies that is is possible by the procedure of the invention to carry out without fault even highly demanding welding work.

EXAMPLE 2

In the experiment, a butt weld was made under water at 3 m depth using the procedure of FIG. 1, wherein the same soft tall oil soap was used as auxiliary substance as in Example 1. The water temperature was about 3° C. The steel that was used was Fe-52 C (corresponding to Norske Veritas shipbuilding steel NVW-36 or NVA-36) and the welding electrodes had been painted with vinyl paint. When the soft tall oil soap was removed from on top of the weld seam about 1 min. after the welding, it was found that the weld bead was still glowing.

The welded specimens were subjected to impact tests according to SFS 3326, at the temperature of 0° C. The fracture energy at the welding material was found to be 37 J, as the means of three tests, and at the melt boundary similarly, 40 J. Norske Veritas requires of the shipbuilding steel equivalent to the material used here, an impact ductility value of 34 J at 0° C. The result did not fall below this limit in any one impact test.

EXAMPLE 3

Similarly as in the preceding examples, a test series was carried out under water, in which the procedure of FIG. 1 was used, and auxiliary substance samples of varying compositions. The results are shown in Table 3, where with regard to each sample assessments have been made of the burning properties in the arc of the respective sample, of the quality of weld seam produced and of the protective film remaining on top of the seam and preventing the formation of hydrogen cracks.

TABLE 3

| Specimen | Burning | Seam quality | Film quality |
|---|---|---|---|
| 1 | Good | Good | Good |
| 2 | Good | Excellent | Good |
| 3 | Good | Good | Good |
| 4 | Good | Good | Good |
| 5 | Good | Good | Good |
| 6 | Good | | |
| 7 | Excellent | Good | Satisfactory |
| 8 | Excellent | Good | Satisfactory |
| 9 | Excellent | Good | Good |
| 10 | Excellent | Excellent | Good |
| 11 | Excellent | Good | Good |
| 12 | Excellent | Poor | Passable |
| 13 | Good | Good | Satisfactory |
| 14 | Excellent | Good | Satisfactory |
| 15 | Good | Excellent | Passable |
| 16 | Excellent | Satisfactory | Passable |
| 17 | Good | Satisfactory | Good |
| 18 | Good | Good | Good |
| 19 | Good | Excellent | Good |

The auxiliary substance specimens used in these experiments had the following compositions:

Specimen 1: Standard soft tall oil soap with 20% water and the rest dry matter, containing 5% soda, 20% sodium salts of resin acids such as abietic acid, and 75% sodium salts of $C_{16}$ to $C_{24}$ fatty acids such as oleic and linoleic acid.

Specimen 2: Standard soft tall oil soap as in the preceding, but containing 25% water.

Specimen 3: Standard soft tall oil soap as in the preceding, but containing 30% water.

Specimen 4: Standard soft tall oil soap with 15% water and the rest dry matter consisting exclusively of sodium salts of resin and fatty acids in proportions as in the preceding specimens.

Specimen 5: Soft tall oil soap as specimen 4, but with 20% water.

Specimen 6: Soft tall oil soap as specimen 4, but with 40% water.

Specimen 7: Soft soap made of tall oil fatty acid, with about 20% water and the rest dry matter having the composition: about 5% soda, 2% sodium salts of resin acids, and the rest sodium salts of $C_{12}$ to $C_{20}$ fatty acids.

Specimen 8: Soft soap made of distilled tall oil, containing water and soda like specimen 7, and of the dry matter of which 10% were sodium salts of resin acids.

Specimen 9: Soft soap as specimen 8, 25% of its dry matter being sodium salts of resin acids.

Specimen 10: Soft soap as specimen 8, of the dry matter of which 30% were sodium salts of resin acids.

Specimen 11: Soft soap as specimen 8, of the dry matter of which 40% were sodium salts of resin acids.

Specimen 12: Soft soap containing water and soda like specimen 7, of its dry matter 80% being sodium salts of resin acids and 5% sodium salts of fatty acids and the dry matter also containing unsaponified compounds.

Specimen 13: Soft soap made of the fatty acids of turnip rape oil, with about 30% water and the rest dry matter containing about 5% soda, the main part of the dry matter being sodium salts of unsaturated fatty acids (about 55% sodium salt of oleic acid).

Specimen 14: Soft soap made of stearin fatty acid, containing about 55% water and its dry matter consisting of sodium salts of saturated fatty acids (about 60% sodium stearate).

Specimen 15: Melted, pure and anaqueous sodium stearate.

Specimen 16: Soft soap as specimen 2, its sodium substituted with potassium

Specimen 17: Soft soap as specimen 2, its sodium substituted with manganese.

Specimen 18: Soft soap as specimen 2, its sodium substituted with zinc.

Specimen 19: Soft soap as specimen 2, its sodium substituted with cobolt.

Best results were obtained with specimens 2 and 10, which were based on the fatty acids and resin acids of tall oil, and having as main components the sodium salts of the resin acids and unsaturated fatty acids. Specimens 7–12 demonstrate that the relative amount of resin acids may vary within fairly wide limits. Thus, good results were obtained both with soft soap containing 2% of resin acid salts and also with a soft soap in which the proportion of these salts was 40%. The soft soap with 80% proportion of resin acid salts (about 95% proportion of the total amount of fatty and resin acid salts) had still good burning properties, but this soft soap had no longer any positive effect on the bead quality. The relatively good results which were obtained with specimens 13–15 go to show that the presence of resin acid salts in the auxiliary substance is not indispensable in itself. Specimen 13 consisted mainly of salts of unsaturated acids, while specimens 14 and 15 featured salts of saturated acids, and thus it appears that the double bonds in the carbon chain or their absence do not constitute a restrictive factor. The carbon chains of the principal components in specimens 13–15 contain between 16 and 18 carbon atoms, and on the whole the number of carbon atoms of all fatty acids found in the specimens were in the range from 10 to 24.

It is seen from specimens 1–3 that small differences in the water content of the soft soap have little effect on the results. However, the high water content in specimen 6 had the effect that the soap became too soft for convenient welding. On the other hand, specimen 15 seems to indicate that the presence of water in the auxiliary substance is not indispensable in itself. The good results obtained with specimens 4 and 5 indicate further that the presence of soda in the auxiliary substance carries no significance regarding the results. Specimens 16–19, again, demonstrate that sodium may be replaced with other metal cations without any detriment to the results.

EXAMPLE 4

A welding test was carried out by the procedure of FIG. 1 in a normal atmosphere, using MIG welding equipment. No protective gas was used. The auxiliary substance was the solid soft tall oil soap mentioned in Example 1. The arc was stable throughout the welding operation and the welded seam produced was excellent.

It is obvious to a person skilled in the art that different embodiments of the invention are not confined to the examples presented and may, on the contrary, vary within the scope of the claims following below. For instance, it is not absolutely necessary that the auxiliary substance totally consist of a soft soap as presented in the examples or equivalent: it may also contain other additives on the side of soft soap.

What is claimed is:

1. A procedure for carrying out arc welding in underwater conditions, or in conditions of high humidity or draught causing similar difficulties for welding, said procedure comprising striking an arc between a welding electrode and a metal base which is being welded and moving the electrode relative to the base so as to produce a seam, and said procedure further comprising providing a paste-like auxiliary substance to the arc area or its immediate vicinity so that it will contribute to the burning taking place therein, whereby the quality of the seam produced is improved, said auxiliary substance comprising, as at least a major component, a soap which is a salt formed by anions of at least one member selected from the group consisting of a fatty acid, a mixture of fatty acids, and a mixture of fatty and resin acids, and by metal cations.

2. A procedure according to claim 1, wherein 0–95% of the soap is salts of resin acids, the remainder being salts of fatty acids comprising 10–24 carbon atoms in a molecule.

3. A procedure according to claim 2, wherein the soap mainly consists of salt of fatty acids comprising 16 to 18 carbon atoms in a molecule.

4. A procedure according to claim 3, wherein the soap mainly consists of salts of a member selected from the group consisting of stearic and palmitic acids.

5. A procedure according to claim 3, wherein the soap mainly consists of salts of a member selected from the group consisting of oleic and linoleic acids.

6. A procedure according to claim 2, wherein 2–40% of the soap is salts of resin acids occurring in tall oil, such as abietic acid, the remainder being salts of fatty acids occurring in tall oil, such as oleic and linoleic acid.

7. A procedure according to claim 1, wherein the auxiliary substance contains water as a further component.

8. A procedure according to claim 7, wherein the auxiliary substance further contains inorganic salts.

9. A procedure according to claim 8 wherein the auxiliary substance is soft tall oil soap with a water content of 0–40% and containing soda as well as sodium salts of acids occurring in tall oil as the soap component.

10. A welding rod for carrying out arc welding in underwater conditions, or in conditions of high humidity or draught causing similar difficulties for welding, said welding rod being coated with an auxiliary substance containing as at least a major component a soap which is a salt formed by at least one member selected from the group consisting of anions of a fatty acid, a mixture of fatty acids, and a mixture of fatty and resin acids, and by metal cations.

* * * * *